Jan. 20, 1925.

E. H. KOCHER 1,523,650

DYNAMO ELECTRIC MACHINE

Filed Sept. 20, 1922

Inventor:
Edward H. Kocher,
by [signature]
His Attorney.

Patented Jan. 20, 1925.

1,523,650

UNITED STATES PATENT OFFICE.

EDWARD H. KOCHER, OF BOONTON, NEW JERSEY, ASSIGNOR, BY MESNE ASSIGNMENTS, TO ECLIPSE MACHINE COMPANY, OF NEW YORK, N. Y., A CORPORATION OF NEW YORK.

DYNAMO-ELECTRIC MACHINE.

Application filed September 20, 1922. Serial No. 589,444.

*To all whom it may concern:*

Be it known that I, EDWARD H. KOCHER, a citizen of the United States, residing at Boonton, county of Morris, State of New Jersey, have invented certain new and useful Improvements in Dynamo-Electric Machines, of which the following is a specification.

My invention relates to dynamo electric machines and is particularly applicable to such machines designed for operation at very low potential.

My invention has for its object a novel construction and arrangement of the field coils of such machines whereby, first, all of the field coils may be readily placed in parallel; second, whereby the machine may be made shorter than heretofore was possible; and third, whereby the machine may be readily connected for either direction of rotation.

Figure 1:
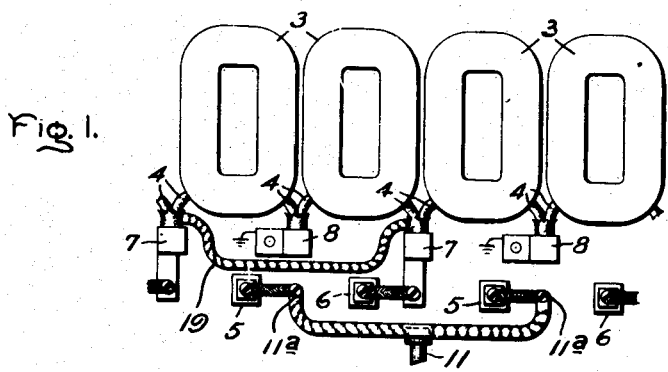
Figure 2:
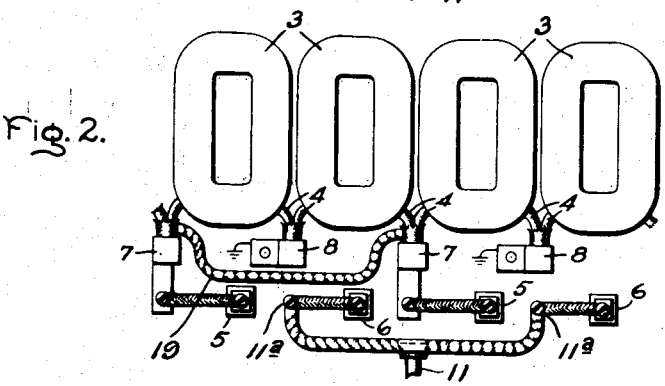
Figure 3:
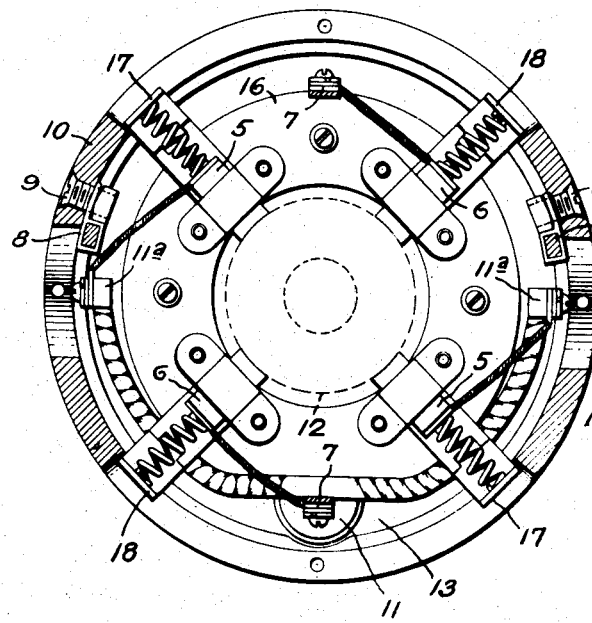
Figure 4:
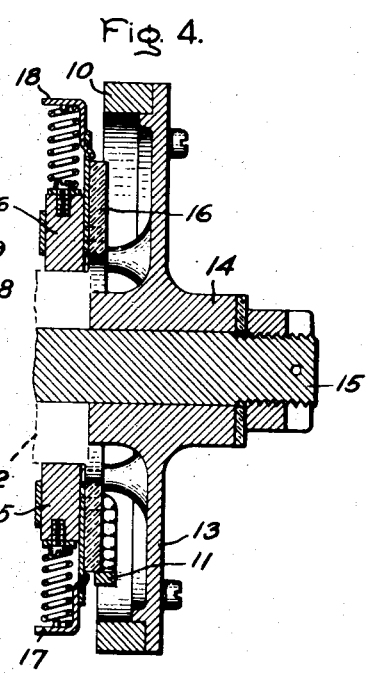

The various features of novelty which characterize my invention are pointed out in the claims annexed to and forming a part of this specification. For a better understanding of my invention, reference may be had to the following description taken in connection with the accompanying drawings, in which Figs. 1 and 2 are diagrams of a dynamo electric machine embodying my invention; Fig. 3 shows a sectional view of a portion of a dynamo electric machine in which my invention is embodied; and Fig. 4 is a sectional view of the machine of Fig. 3, said section being taken at right angles to that of Fig. 3.

My invention is particularly applicable to motors used for starting gas engines, such as automobile engines, where the source of current is a storage battery of say, six or twelve volts. It permits the manufacture of large numbers of field coils, all alike, which may be easily assembled in the machine. Furthermore, my construction permits the assembly of machines rapidly and for either direction of rotation desired.

Referring to Figs. 1 and 2 of the drawing, 3 are field coils, all alike and having the same length of leads 4. My invention is applicable to a dynamo electric machine having at least four such field coils and such machines usually have just four such coils. 5 and 6 are sets of commutator brushes, the sets 5 being of one polarity and the sets 6 of the opposite polarity. All of the field coils 3 are connected in parallel, two adjacent field coils being connected in parallel from one set of brushes and the other two field coils being connected in parallel from another set of brushes.

The adjacent leads of the field coils are connected to terminals 7 and 8. There are two similar terminals 7 and two similar terminals 8. The terminals 8 are adapted to be connected to one side of a source of potential by means of a ground or otherwise. When a ground is used, I electrically connect the terminals 8 by means of bolts 9 to the frame 10 of the dynamo electric machine. One of the terminals 7 is connected to one set of brushes and the other terminal 7 is connected to the other set of brushes of the same polarity as already shown in Figs. 1 and 2.

An incoming post 11 for conducting current to the armature and field windings of the machine is provided with two terminals 11ª. It will be noted from Figs. 1 to 3 that one of the terminals 11ª of the incoming post 11 is equally spaced away from the adjacent sets of brushes and the other terminal 11ª of the incoming post is substantially equally spaced from the other two sets of brushes, whereby the terminals of the incoming post may be readily connected to brushes of either polarity as will be hereinafter more fully explained. It will also be noted in these same figures of the drawing, that one of the terminals 7 of the field coils is substantially equally spaced from two adjacent sets of brushes, and that the other terminal 7 is similarly spaced from the other two sets of brushes, whereby these terminals of the field coils may be connected to sets of brushes of either polarity. The terminals 7 of the field coils and the terminals 11ª of the incoming post are thus alternately disposed about the machine and substantially equally spaced with reference to the sets of brushes, whereby either a terminal of said post or a terminal of said field coil may be connected to the same set of brushes. The incoming post 11 is shown mounted in an end frame 13 of the dynamo electric machine but insulated therefrom. This end frame has a bearing 14 in which the armature shaft 15 of the machine is journalled. A ring 16 of insulating material is suitably fastened in the end frame and has mounted thereon the brush holders 17 and 18 carrying the brushes 5 and 6.

Fig. 1 shows a machine assembled for one direction of rotation and Fig. 2 shows the same machine assembled for the opposite direction of rotation. In Fig. 1, current enters the machine at the incoming post 11, divides and flows to the terminals 11ª, then through the pigtails of the brushes 5, thence into the commutator (shown at 12 in Fig. 3), through the armature to the brushes 6, the pigtails of these brushes, thence to the terminals 7 of the field coils, through the field coils 3 all in parallel to the terminals 8, and thence to ground. In Fig. 2, the motor is connected for the opposite direction of rotation by a reversal of the armature connections, the current passing through the field coils in the same direction as before. The connections of Fig. 2 are like that of Fig. 1, except that the terminals 11ª of the incoming post are connected to the pigtails of brushes 6, and the terminals 7 of the field coils are connected to the brushes 5. This reversal of connections is obtained by simply turning the brushes through 180 degrees in their holders. The terminals 7 may be cross-connected by a cable 19 as shown in Figs. 1 and 2 to insure the parallel connections of the field coils in cases of poor contact of one of the brushes that are connected to these terminals 7.

Since the leads and the terminals of the field coils are short and there are no leads with the exception of cable 19 connecting one coil with another, a dynamo electric machine embodying my invention can be made materially shorter than those heretofore constructed, which required the connection of the field coils together by a number of cables.

I desire it to be understood that my invention is not limited to the particular arrangement shown and described and I aim in the appended claims to cover all modifications which do not depart from the spirit and scope of my invention.

What I claim as new and desire to secure by Letters Patent of the United States is:

1. In a dynamo electric machine, sets of commutator brushes, at least four field coils, each of said field coils being alike and having the same length of leads, said field coils being all connected in parallel, two of said field coils being connected in parallel from one set of brushes and the other set of field coils being connected in parallel from another set of brushes.

2. In a dynamo electric machine, sets of commutator brushes, four field coils, each of said field coils being alike and having the same length of leads, said field coils having four terminals, two of said terminals being adapted to be connected to one side of a source of potential, one of the other of said terminals being connected to one of said sets of brushes and the other of said terminals being connected to another of said sets of brushes of the same polarity as said first mentioned set whereby said field coils are all connected in parallel.

3. In a dynamo electric machine, sets of commutator brushes, four field coils, each of said field coils being alike and having the same length of leads, said field coils having four terminals, two of said terminals being adapted to be connected to one side of a source of potential, one of the other of said terminals being substantially equally spaced away from two adjacent sets of brushes, and the other of said terminals being substantially equally spaced away from two other sets of brushes whereby said terminals of said field coils may be connected to brushes of either polarity, and an incoming post having two terminals, one of said terminals of said post being substantially equally spaced away from two adjacent sets of brushes and the other of said terminals of said post being substantially equally spaced away from the other two sets of brushes whereby the terminals of said incoming post may be connected to brushes of either polarity.

4. In a dynamo electric machine, sets of commutator brushes, four field coils, each of said field coils being alike and having the same length of leads, said field coils having four terminals, two of said terminals being adapted to be connected to one side of a source of potential, and an incoming post having two terminals, said other terminals of said field coils and said terminals of said incoming post being alternately disposed and substantially equally spaced with reference to said sets of brushes whereby either a terminal of said post or a terminal of said field coil may be connected to the same set of brushes.

5. In a dynamo electric machine, a commutator, four commutator brushes having pigtails and being substantially equally spaced about said commutator, four field coils, each of said field coils being alike and having the same length of leads, said field coils having four terminals, two of said terminals being adapted to be connected to one side of a source of potential and an incoming post having two terminals, said other terminals of said field coils and said terminals of said incoming post being alternately disposed and substantially equally spaced with reference to said brushes whereby a pigtail of the same brush may be connected to either a terminal of said post or a terminal of one of said field coils.

In witness whereof, I have hereunto set my hand this 18th day of September, 1922.

EDWARD H. KOCHER.